United States Patent [19]

Keats

[11] 4,422,140
[45] Dec. 20, 1983

[54] MONITORING MEANS FOR INDUSTRIAL PROCESS PLANTS

[75] Inventor: Albert B. Keats, Dorchester, England

[73] Assignee: United Kingdom Atomic Energy Authority, London, England

[21] Appl. No.: 183,451

[22] Filed: Sep. 2, 1980

[30] Foreign Application Priority Data

Sep. 12, 1979 [GB] United Kingdom ................ 7931561

[51] Int. Cl.³ ....................... G06F 11/30; G06F 15/46
[52] U.S. Cl. .................................... 364/184; 364/138; 364/186; 371/20; 371/36; 376/217; 340/825.06
[58] Field of Search ............... 364/184, 185, 186, 178, 364/179, 138, 139, 504, 550, 551; 376/216, 217; 371/20, 24, 27, 36, 25, 26, 28, 29, 68, 71; 340/825.06, 825.07, 825.1, 825.11, 825.16, 825.79

[56] References Cited

U.S. PATENT DOCUMENTS

| | | | |
|---|---|---|---|
| 3,109,929 | 11/1963 | Picard | 364/185 |
| 3,435,416 | 3/1969 | Kretsch et al. | 340/825.1 |
| 4,048,483 | 9/1977 | Keats | 371/36 |
| 4,200,226 | 4/1980 | Piras | 364/186 X |
| 4,236,220 | 11/1980 | Kogami et al. | 364/185 X |
| 4,292,129 | 9/1981 | Barry | 364/504 X |

Primary Examiner—Joseph F. Ruggiero
Attorney, Agent, or Firm—Larson and Taylor

[57] ABSTRACT

System failure in the acquisition of data from a process plant such as a nuclear reactor owing to stuck signals is avoided by arranging input signals from transducers in the plant in a test pattern. The signal inputs are physically wired in the test pattern which is then decoded by either or both of a computer based system which allows for the test pattern and/or a hard wired system which mimics the input connections. Transmission of the multiplexed signals is made dynamic by provision of a polarity reverser switch (10) which alternates between signals or scans. A pattern recognition logic or a mimicing physical wiring decode the signals from the inputs or the computer system and the hard wired system respectively.

5 Claims, 13 Drawing Figures

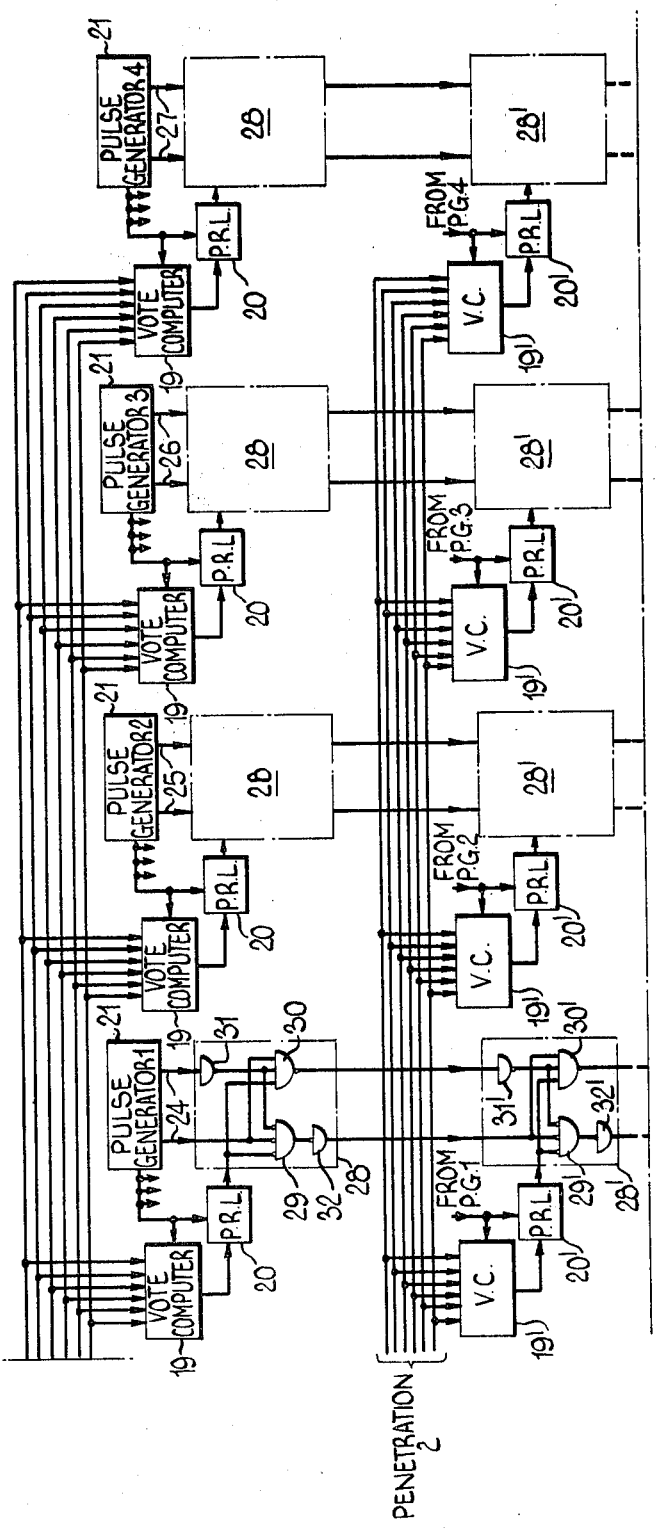

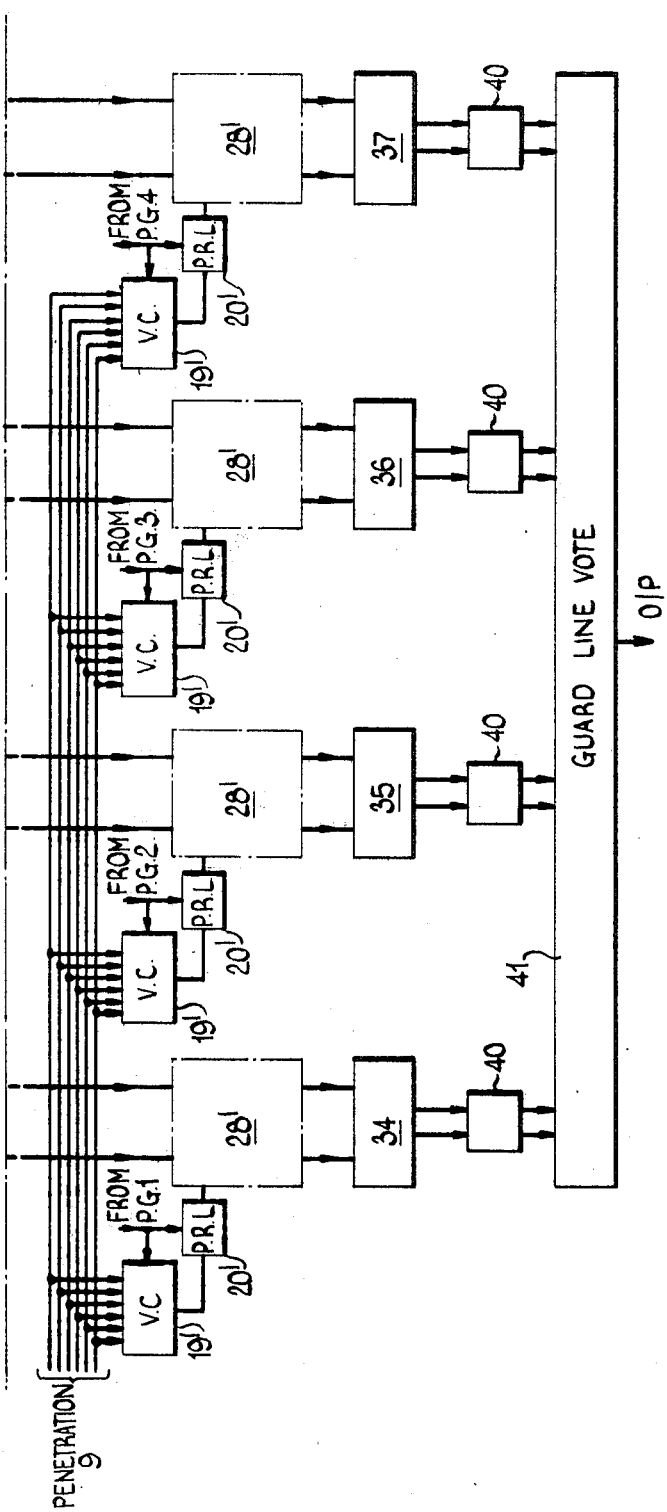

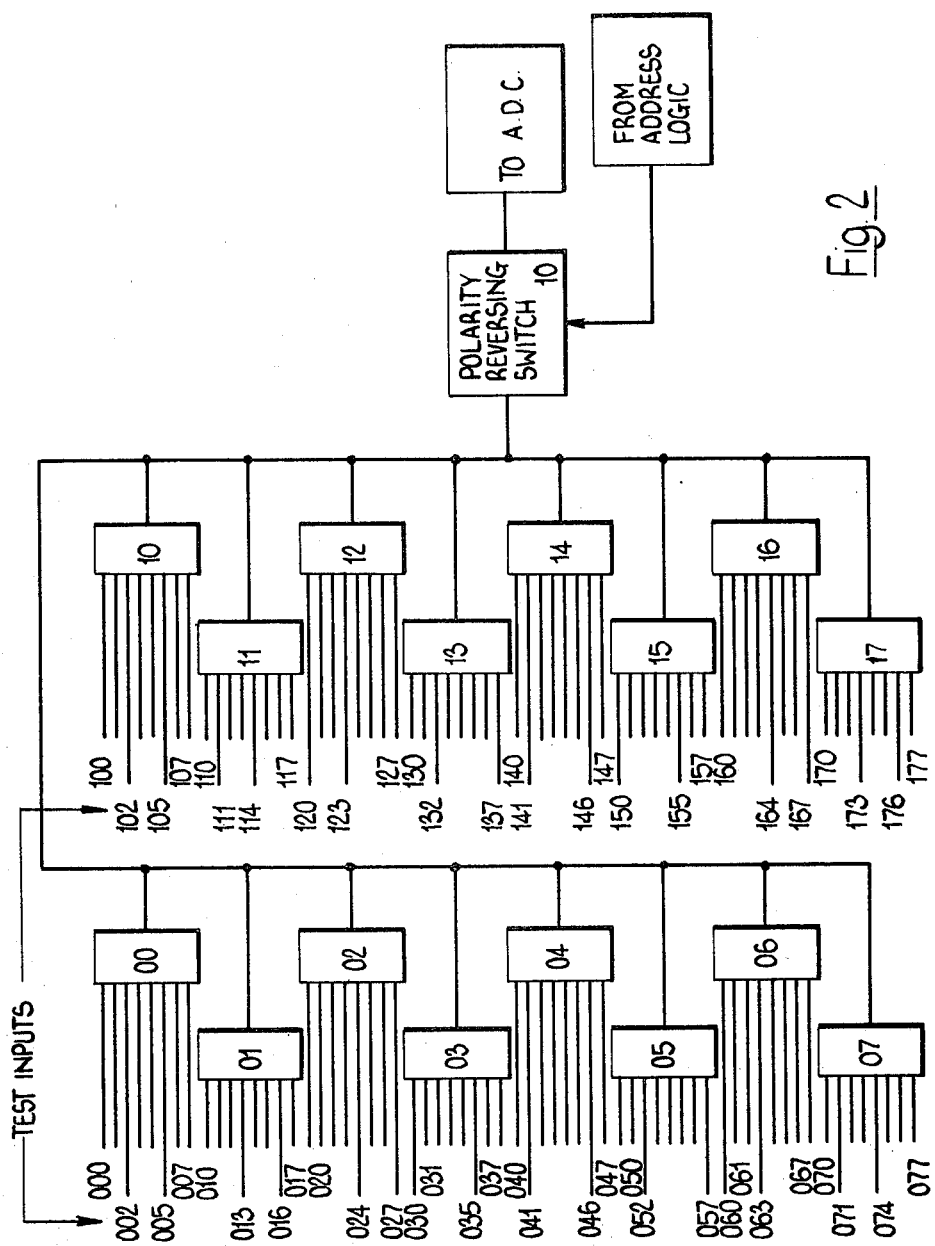

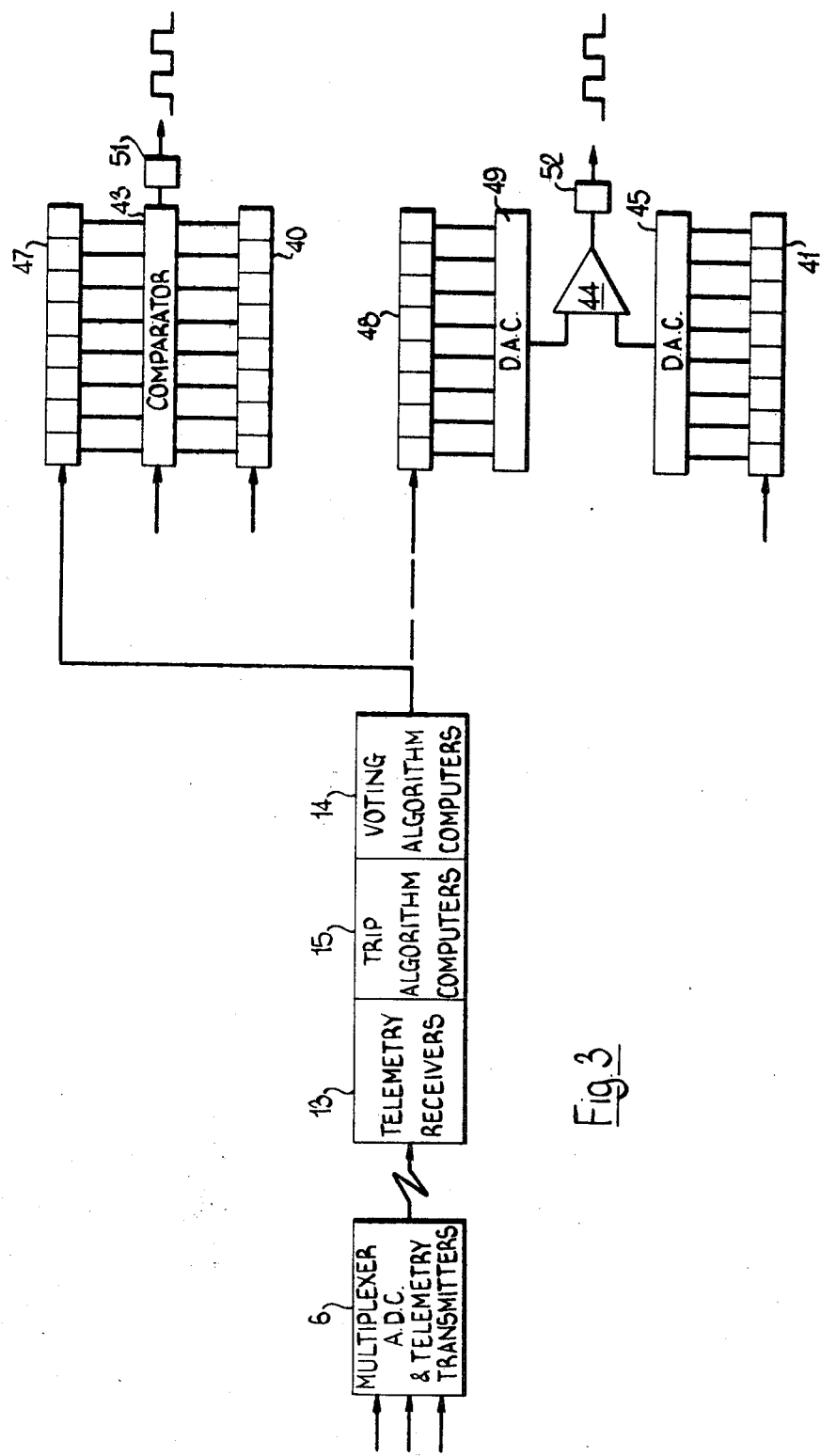

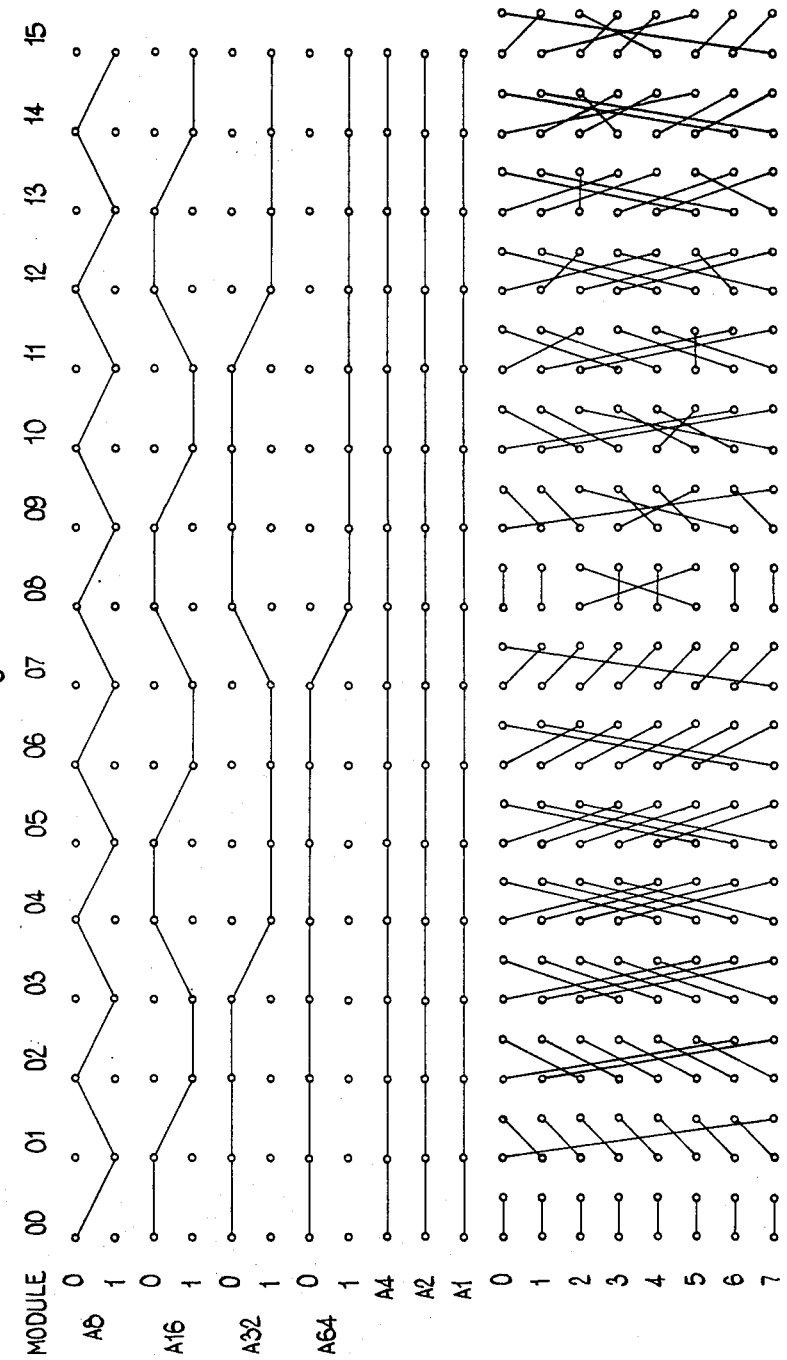

MONITORING MEANS FOR INDUSTRIAL PROCESS PLANTS

BACKGROUND OF THE INVENTION

This invention relates to monitoring means for industrial process plants or apparatuses.

One application of the present invention is in association with nuclear reactors, wherein fault conditions such as overheating may initiate shutdown of the plant. A data handling system suitable for plant control is described in our granted U.S. patent specification Ser. No. 4,048,483.

An object of the present invention is to provide a monitoring means which tends to have a high integrity.

BRIEF SUMMARY OF THE INVENTION

Accordingly the present invention provides a monitoring means for an industrial process plant or apparatus which processes data signals from inputs from equipment or transducers associated with the process or apparatus and provides information or control signals therefore, in which monitoring means the data inputs are wired in groups containing a test pattern. Preferably, the test pattern comprises a cyclic group. Each group may be recognized by positions of test signals therein.

Preferably, the monitoring means comprises a computer based system. The computer based system may recognise the test pattern by means of a pattern recognition logic. Advantageously, the monitoring means comprises a polarity reverser switch whereby input signals from said equipment or transducers may be multiplexed into the monitoring means. Alternatively or additionally to the computer based system, the monitoring means may comprise a hard wired analogue instrument system. Advantageously, the hard wired system recognises the test pattern by means of decoders connected to mimic the transducer connections.

Preferably, the decoders are connected to trip units. A dynamic alternating signal is fed into the trip units owing to the action of the polarity reverser switch so that system failures are safe. Advantageously, signals fed to the trip units are analysed for rate of change, and if this is outside preselected desired rates then the unit is tripped. Analysis may also be made of absolute value and if this is outside a preselected range the unit is tripped. Preferably, each trip unit comprises a summing operational amplifier with a feedback integrator and zero crossing detector. An alternating signal may be fed into the summing amplifier in combination with the transducer signals, the alternating signal defining the limits for the signals. Preferably, one of the test signals is a high level reference signal outside the normal operating range, which signal is multiplexed with the transducer signals, the high level signal being gated through a comparator not to alarm, but the alarm being raised if another signal should appear on the high level channel owing to faulty multiplexing.

An embodiment of the present invention will now be described by way of example only with reference to the accompanying drawings in which:

BRIEF DESCRIPTION OF THE DRAWINGS

FIG. 2 shows part of FIG. 1 in more detail, FIG. 3 is a block view of a self checking facility for the system of FIG. 1, FIG. 7 is another more detailed view of part of FIG. 4.

DESCRIPTION OF THE PREFERRED EMBODIMENT

Figure 1A:
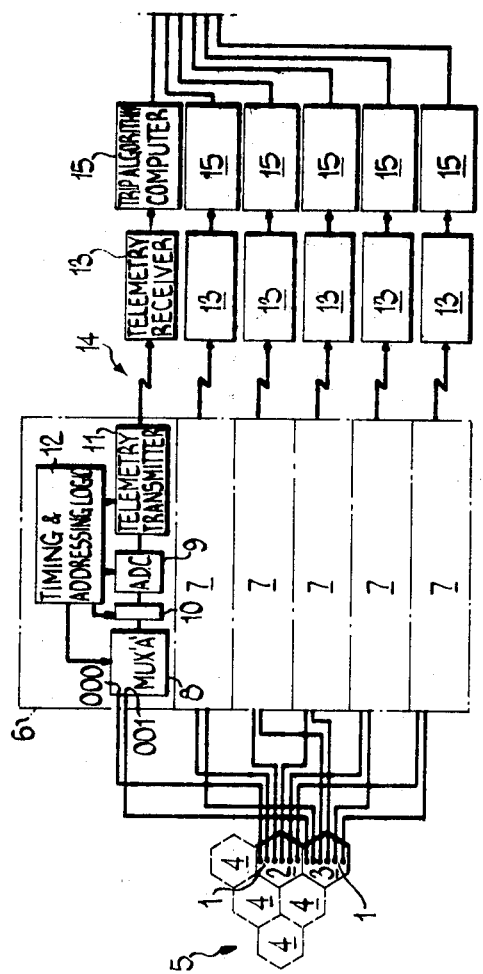
FIG. 1 is a diagram showing the manner in which FIGS. 1a, 1b and 1c fit together, these latter figures, when taken together, constituting a block diagram of a computer based system.

Modern industrial process plants are tending to become larger and more complex and this tendency leads to the replacement of individual control and monitoring instruments, each dedicated to a particular task, by common data processing equipment which is usually a computer time shared between the multiplicity of plant parameters required to be monitored or controlled. Transducers measure the magnitude of plant parameters and signals from the transducers are fed sequentially to the common data processor by a multiplexer which samples each of the measurement transducers in turn. The time division multiplexed sampled data is normally converted to digital form by an analogue to digital convertor before being passed into the common processor. The common processor normally contains a store in which the current value of each input is memorised during the time interval between consecutive sampling instance.

Multiplexed sampled data systems of this type are widely used in process plant data acquisition and control systems. There are, however, certain potential modes of failure of the multiplexer which may have serious consequences if the correct operation and safety of the plant depend upon its correct operation. Protection against such failures may be achieved by duplication for replication of the multiplexer but a preferred solution is to incorporate continuous self monitoring properties.

Particular modes of failure which need to be detected include: failure of one or more of the multiplexer address bits to change state, complete storage of the multiplexer, failure of any part of the common time shared signal path to accurately convey the sampled data. The first of the above mentioned modes of failure results in a stuck at 1 or stuck at 0 fault, which causes the multiplexer to repeatedly sample a limited sub-set of the full address range. This may be illustrated by the following comparative example wherein there is illustrated by (a) a full address range for an 8 input multiplexer and by (b) a restricted address range for an 8 input multiplexer with its most significant address bit stuck at 0.

| Binary address | | | Decimal (or octal address) |
|---|---|---|---|
| | 000 | 0 | |
| | 001 | 1 | |
| | 010 | 2 | |
| | 011 | 3 | |
| | 100 | 4 | |
| | 101 | 5 | |
| | 110 | 6 | |
| | 111 | 7 | |
| (b) | 000 | 0 | |

| | |
|---|---|
| 001 | 1 |
| 010 | 2 |
| 011 | 3 |
| 000 | 0 |
| 001 | 1 |
| 010 | 2 |
| 011 | 3 |

From example (b) above, it can be seen that the first sub-set of the address range is repeated, that is the addresses 4 to 7 are bypassed. Other restricted sub-sets of the full address will result from other address bits being stuck at 1 or stuck at 0. The stored values of those inputs which are bypassed as a result of the multiplexer addressing fault, will either retain the value stored prior to the fault or will be overriden by data from other inputs, depending upon whether or not the fault affects the memory address within the computer.

The second mode of failure referred to above, i.e. complete stoppage of the multiplexer, causes the memory to retain the last set of values stored prior to the fault. Finally, a limited or complete failure of any part of the common time shared signal path between the multiplexer and the processor to accurately convey the sampled data might be constituted by for example one or more data bits out of the analogue to digital convertor being stuck at 1 or stuck at 0.

The monitoring means of the present invention has particular application to a nuclear reactor, wherein thermocouples are utilised to determine the temperature of parts of the reactor, the thermocouples terminating at cold junctions on the reactor top shield. Multiplexing tends to be used to reduce the number of cables to be conveyed away from the top shield to remote signal processing equipment. Configuration of the multiplexers as well as their number tends to be defined largely by the physical arrangement of the top shield and the number of thermocouples associated with each penetration of the shield. Reactor safety practice requires that replicated sensor channels are segregated so that replicated thermocouples in any group must each be handled by a separate multiplexer and telemetry link. Therefore, there are at least as many multiplexers and telemetry links as there are thermocouples per group.

Figure 1:
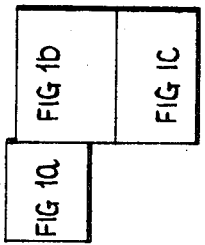

Reference is now directed to FIGS. 1a to 1c (and in particular 1a), in which thermocouple connections are generally indicated by 1, 2 hexagonal groups 2,3 being shown in full lines and the location of four other groups by dotted lines 4. The groups 2, 3 and 4 are in an assembly 5. An assembly such as the assembly 5 typically includes ninety-six groups. In the example of FIG. 1, nine similar assemblies are used but for the sake of simplicity only the assembly 5 is shown. The thermocouples 1 are connected to a data transmission assembly 6, which in practice is mounted on top of the reactor shield. The data transmission assembly is repeated in six similar modules 7 (only the upper one of which is shown in detail) and each module receives one of the thermocouple signals from each of the groups 2, 3 and 4; there therefore being as many modules 7 as there are thermocouples in each group. Each of the modules 7 includes a multiplexer arrangement 8 for receiving the signals from the thermocouples. The output of the multiplexers 8 is fed to analogue to digital convertor 9 via a polarity reverser switch 10 for switching polarity of the multiplexer on each scan. The output of the reverser switch 10 is to a telemetry transmitter 11. The multiplexer arrangement 8 and transmitter 11 are controlled in accordance with the logic of a timing and addressing unit 12. Each multiplexer 8 has eight inputs and receiving two of these as test inputs. One test input is provided by the thermocouple cold junction temperature measurement and the other test input is provided by a high temperature reference signal, which signal is a signal outside the range of signals which can be permissibly received from the thermocouples.

Reference is now directed to FIG. 2 as well as FIG. 1. The transducers are annotated in an octal numbering system. The cold junction input has the address 002 into the multiplexers 8 and the high temperature reference 005. Addresses 000, 001, 003, 004, 006 and 007 are taken by the thermocouples. The first 2 digits of the addresses signify the multiplexer address. The test inputs (see FIG. 2) are rotated for each multiplexer, so that for multiplexer 00 the test inputs are 2, 5; for multiplexer 01, the test inputs are 3, 6, and for multiplexer 02, the test inputs are 4, 7 and so on. In all, there are typically one hundred and twenty-eight entries to each multiplexer arrangement 8. Therefore, in FIG. 2, there is shown a one hundred and twenty-eight input multiplexer in which the cyclically progressive pattern is formed from sixteen groups, each of 8 inputs. Each group comprises 6 transducer inputs (thermocouples) and 2 interleaved test inputs. When describing numbers based on the binary system, it is convenient to use octal numbers in which octal digit represents the eight possible values of three consecutive binary digits. The binary digits required to address a one hundred and twenty-eight input multiplexer may therefore be written as three octal digits, the values of which range from $000_8$ for binary 0 000 000 to $177_8$ for binary 1 111 111. The subscript 8 is used to indicate the base of the number range. The least significant octal digit covers the address range 0 to 7 within each group of 8 inputs. The most significant two octal digits cover the address range $00_8$ to $17_8$ which is the number of groups of eight inputs which make up the total of one hundred and twenty-eight inputs. The test inputs of the first group 00 occupy addresses 2 and 5 so that their composite addresses are $002_8$ and $005_8$. In the second group 01 they are shifted one place to addresses 3 and 6 so that their composite addresses are $013_8$ and $016_8$. The addresses of the test inputs then advance cyclically as explained above and as shown in the following table:

| | |
|---|---|
| 013 | 016 |
| 024 | 027 |
| 035 | 030 |
| 046 | 041 |
| 057 | 052 |
| 060 | 063 |
| 071 | 074 |
| 102 | 105 |

In order to avoid repeating the same cyclic pattern of the addresses of the test inputs over the second half of the address range, ie $100_8$ to $177_8$, the cyclic progression of the test input addresses is reversed, ie:

| | |
|---|---|
| 102 | 105 |
| 111 | 114 |
| 120 | 123 |
| 137 | 132 |
| 146 | 141 |
| 155 | 150 |
| 164 | 167 |

| -continued | |
|---|---|
| 173 | 176 |
| 002 | 005 |

The penultimate line of the table of reverse addresses indicates end of cycle and the last line the start of the next cycle.

In addition to ensuring that the input multiplexer is sampling all of the inputs, it is necessary to check that the input data is being refreshed on each cycle of the multiplexer, since otherwise if the multiplexer were to stop, the last set of input data would be retained in the memory and the processor would repeatedly reuse this obsolete data. The problem of non-refreshing of the input data may be mitigated in either or both of the following two ways. Firstly, the memory capacity available for the input data could be limited so that some degree of overwriting of input data takes place within one complete cycle of the multiplexer. Consequently, the generation of a complete status word pattern would not be possible by repeated use of a limited sub-set of a complete cycle of input data. Absence of the complete status work pattern would be readily detected by the processor. Secondly, a property of the input data, which is conveniently polarity is forced to change on consecutive cycles of the multiplexer. A polarity reversing switch following the multiplexer, which switch changes state on completion of every cycle of the multiplexer, causes the polarity of the input data stored in the memory of the processor to be reversed each time it is refreshed. The processor is arranged to anticipate this regular reversal of polarity and if it fails to occur because of a failure of the multiplexer to refresh the memory, an incorrect status bit pattern will be generated and recognised as described below. Provision of a polarity reverser has the additional advantage that it exercises the common data path on each multiplexer cycle, thus revealing faults which restrict its range of movement. In a simpler but less comprehensive arrangement, polarity of the test inputs can be reversed only on each cycle of a multiplexer arrangement including a group of multiplexers.

Any numbering system, e.g. a decimal system could be used in place of the octal system, rotation being effected in a similar manner and the test signal or signals being located at any suitable point in the system. In any such system, a hard wired equivalent of a computer cycling test is provided as in the present example.

Each of the transmitters 11 transmits serials asynchronous data to a respective telemetry receiver 13 via a respective telemetry line 14. The output from the receivers 13 is to a respective computer 15. The computers 15 receive an input from their respective telemetry receiver on 2 parallel buses (shown schematically as an arrow), one bus carrying multiplexer addresses and the other bus input readings from the thermocouples 1, normalised to the full scale range of the analogue to digital convertors 9. The readings, with their corresponding addresses, appear sequentially on the buses at the scanning rate determined by the clocks in the unit 12. Each computer 15 receives the thermocouple readings asynchronously from the telemetry receiver and stores them in an input buffer area of random access memory. On recognising the last multiplexer address, the contents of the input buffer (i.e. one scan of the multiplexer) are relocated into a processing area of random access memory, leaving the input buffer ready to receive the input from the next scan.

The computers 15 take account of the polarity of the data which will change on successive scans into a respective buffer for the reasons explained above in connection with the polarity switcher 10.

The processing of the currently stored block of readings proceeds in groups of eight readings corresponding to the eight inputs of a multiplexer in an arrangement 8. Each group contains six thermocouple readings and the reference signals provided by the cold junction compensation temperature reading and the high temperature reference reading referred to above. The cold junction temperature is copied into a working register and then cold junction compensation is performed, followed by a temperature trip analysis on each of the eight readings including the cold junction and high temperature reference. If the status of the reading is satisfactory, i.e. it has not changed too rapidly since its previous value nor gone outside pre-selected limits, then a status reading of 1 is generated. Alternatively, if the status is not satisfactory then a status reading of 0 is generated. Thus, assumming satisfactory status, the word 11011011 will be generated (the 0's being given rise to by the cold junction and high temperature reference inputs).

When the status word is assembled, it is transmitted along one of a group of data highways 18. Each highway is tapped by one of four replicated voting computers 19 (see FIG. 1b) associated with each assembly such as 5. The process is then repeated on the next eight input readings to assemble the next status word. All sixteen status words representing the states of all one hundred and twenty-eight inputs must be assembled and transmitted to the voting computer within one multiplexers scan interval so that the computers 15 are ready to receive the next block of readings. The computers 15 take account of the order and polarity of the input data as determined by the multiplexer wiring (rotated one place for each multiplexer as explained previously) and the operation of the polarity switch 10.

The voting computers 19 receive status words asynchronously from the computers 15 to which they are connected and implement a voting procedure on each set of bits representing the number n of thermocouples in each group. In this way, the eight bit status words from the computers 15 are assembled within the voting computer 19 in a sixteen word input buffer which accommodates one complete scan of the one hundred and twenty-eight inputs. A separate sixteen word input buffer is provided in the voting computer for each of the computers 15 which feed into it. As each buffer is filled, its contents are transferred to an associated stack. Before implementing the voting routine, it is necessary to rotate the words in the stack to a common datum to ensure that the voting routine is implemented on the n status bits originating from the same group. The position of the status words in the stack can be identified from the position of the high temperature and cold junction reference Os in the status words. When the status words are aligned in the n stacks, an m out of n voting routine may then be implemented on the "next word" out of the n stacks. The voting algorithm yields a single eight bit voted status word for each group of n status words taken sequentially from the stacks. The voted status word will contain the voted status of six sub-assemblies (normally 1) one cold junction correction input and one high temperature reference input (normally 0). The position of the cold junction correction and high temperature reference status bit in the voted status word will shift by one binary place in each successive word as constrained by the physical wiring of the multiplexer inputs.

The output from the vote computers is to a respective pattern recognition logic unit 20. The arrangement of the pattern recognition logic is described in more detail below with reference to FIG. 3. The pattern recogition logic examines the voted status words generated by the voting computers and generates a dynamic (square-wave) stimulus for logic circuitry only if the normal healthy bit pattern is detected. Pulse generators 21 are shown feeding to the voter computers 19 and pattern recognition logic units 20 for timing purposes. The pulse generators 21 also feed to four guard lines 24, 25, 26 and 27. The pulse generators 21 each feed into the guard lines via logic circuitry 28 including NAND gates 29 and 30 and inverters 31 and 32. The pattern recognition logic feeds into the guard lines via input terminals into the NAND gates 29 and 30. The guard line logic combines the pulse signals with the dynamic stimulate provided from the pattern recognition logic 20. Consequently, while the units 20 are detecting a healthy pattern, the pulses from the generators pass through the guard line logic circuitry. However, if one of the pattern recognition logic units 20 becomes latched as would happen in a fault situation (as described below with reference to FIG. 3), the pulses could not pass down the appropriate guard line. The guard line pulses, when present, pass through one of monitors 34, 35, 36 and 37 (see FIG. 1c) associated with guard lines 24, 25, 26 and 27, respectively to an appropriate one of the pulse to direct current convertors 40. The convertors 40 are connected to guard line voting logic unit 41, which in turn can shut down the reactor if more than one guard line indicates a fault.

Parts of two more of the nine assemblies such as 5 are shown after the computers 15. These parts are similar to those associated with the assembly 5 and are indicated by like reference numerals with a prime. The guard lines are dotted where they pass through computer systems associated with other assemblies. It is to be noted that the pulse generator 21 supplies pulses to the guard lines through the system and also to the voting computer 19' and pattern recognition logic units 20'.

Reference is now directed to FIG. 3, wherein one of the pattern recognition logic units is shown in more detail, like reference numerals to FIGS. 1a and 1c being used for like parts. The data transmission and telemetry arrangements and computers are shown in block form in FIG. 3. Each voted status word normally comprises six bits set to one (healthy groups of thermocouples) and two set to 0, the two test inputs. The position of the 0 bits in the voted status words is determined by the wiring of the multiplexer and the entire eight bit pattern advances by one binary place on each successive word. Consequently, the pattern recognition logic comprises shift registers 40, 41 for a digital and analogue mode of operation, respectively, and comparators 43, 44 for the digital and analogue mode. The analogue mode also employs a digital to analogue convertor 45 for the analogue comparator system. Status registers 47 and 48 are provided for the digital and analogue systems, respectively, a digital to analogue convertor 49 being connected between register 48 and comparator 44. Latches 51, 52 are connected to the outputs of comparators 43, 44 respectively.

The normal bit pattern 11011011 is loaded into the shift registers on setting up the system or manual reset and is then shifted by one place each time a new voted status word is generated by the appropriate voting computer 19. To initialise the logic elements, the first word, formed from the first 8 inputs to the multiplexer is loaded into the shift register at the same time as the corresponding status word is generated by the computer. Thereafter, the reference pattern held in the shift register, is shifted by one place each time a new status word is generated by the computer. The reference and output patterns should therefore shift in synchronism. To maintain fully dynamic operation and continuous monitoring of the comparator itself, the pattern match is tested before and after shifting the reference pattern, ie twice for each new status word generated by the computer. The output of the comparator should therefore be 0 before shifting (indicating a mis-match) and one after shifting (indicating a correct match). The alternating one and 0 output of the comparitor provides the dynamic stimulus, after antification, for the plant shutdown actuators. The shifting of the reference pattern is made conditional upon recognition of the correct match. The logic therefore becomes latched is a mismatch is directed until it is manually reset.

Reliable operation of the monitoring and control system is enhanced because the cyclic physical wiring of the input transducers removes a cycling operation from the computer enabling the latter to be both simpler and less liable to cause an unsafe failure of the system owing to incorrect operation of programming. Also, so called computer handshake problems are avoided.

In summary, a data acquisition and processing system using the above principles forming part of a computer based plant (e.g. nuclear reactor) protection system has the dynamically generated status word sequence which is used advantageously as a fail safe operational stimulus for the plant shutdown actuators. Recognition of the correct status pattern is implemented in hard wired logic external to the computer system so that the overall self monitoring and fail-safe properties are not dependent upon correct operation of computer programming. The pattern recognition logic removes the operational stimulus from the plant actuator, if it fails to recognise the correct pattern due to; deviation of any one of the system inputs beyond prescribed pre-selected limits, a hardware fault, a programming error or a wiring error.

Figure 4A:
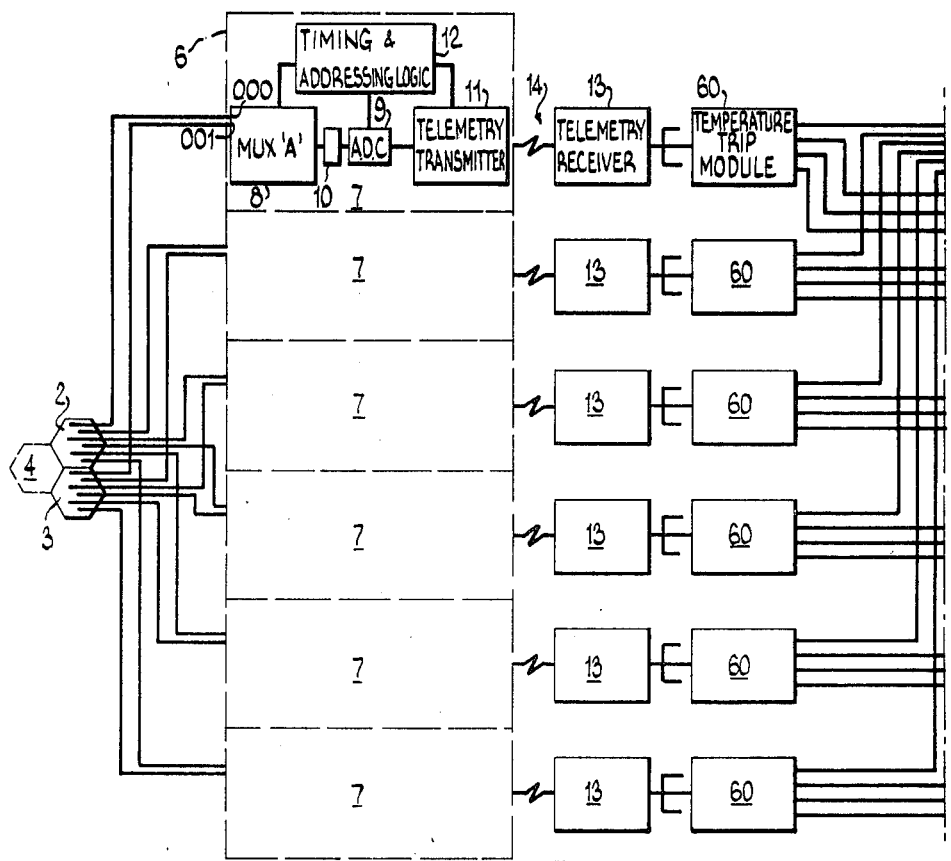
FIG. 4 is a diagram showing the manner in which FIGS. 4a and 4b fit together, the latter figures, when considered together, constituting a block diagram of a hard wired circuit system, FIGS. 5a and 5b, collectively referred to as are, taken together, a more detailed view of part of FIG. 4.
Figure 4:
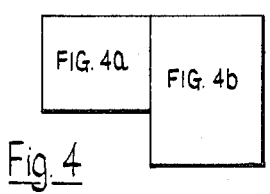
Figure 4B:
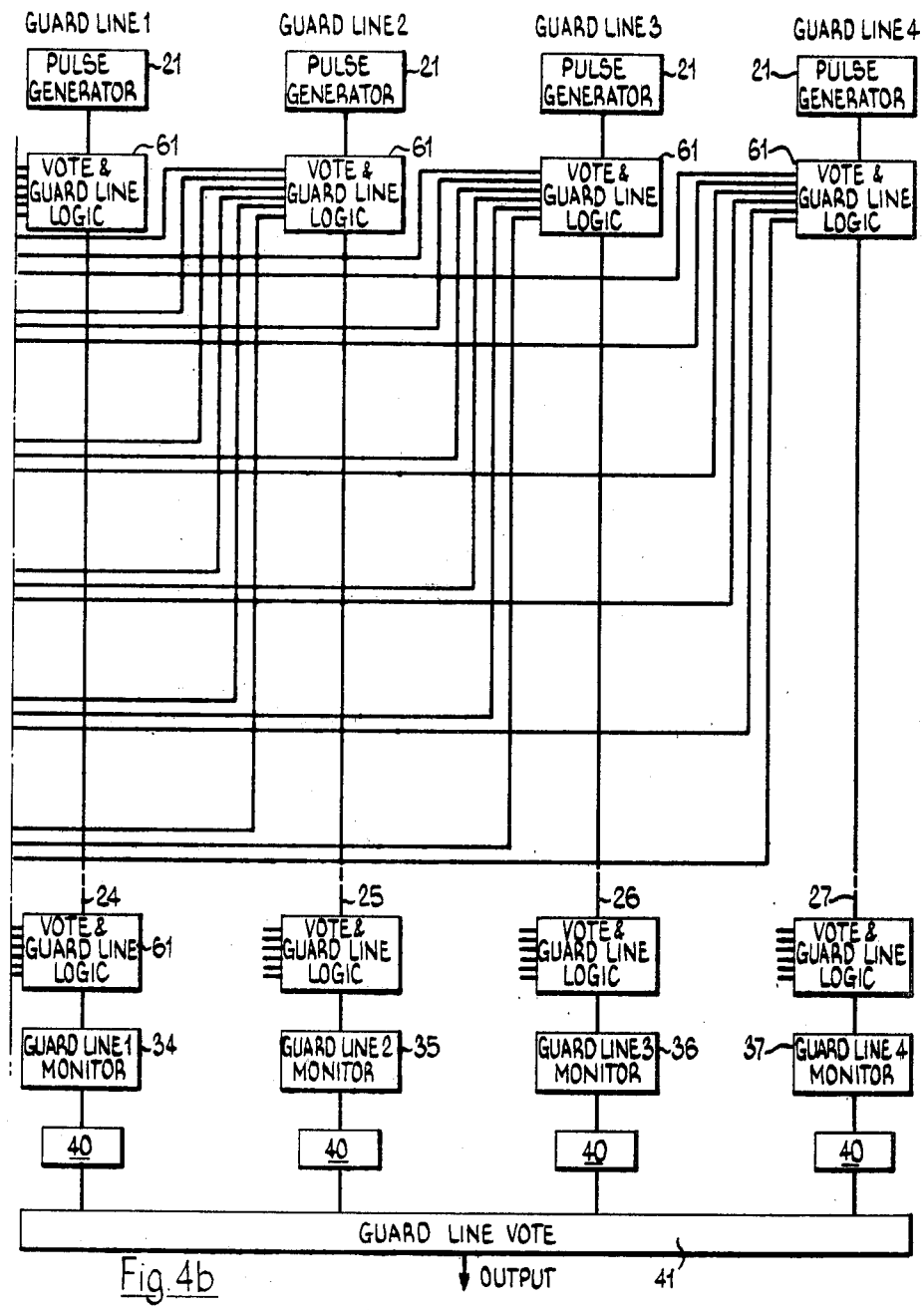

Reference is now directed to FIGS. 4a and 4b, which show a hard wired system for receiving data signals from the thermocouples, which status signals are coded in the same way as described above in connection with the computer system. In FIGS. 4a and 4b, like reference numerals to FIGS. 1a to 1c are used for like parts. The hard wired system of FIGS. 4a to 4b preferably uses separate telemetry systems to the computer system of FIGS. 1a to 1c, but the same telemetry system can be used for test purposes provided the systems are separately buffered. In general, it can be seen that the main differences from the computer system are the substitution of temperature trip modules 60 (see FIG. 4a) for the computers and vote and guardline logic units 61. There are six sets of sixteen temperature trip modules 60 of which only one set of six is shown. Each temperature trip module contains six trip units one for each thermocouple.

Figure 5A:
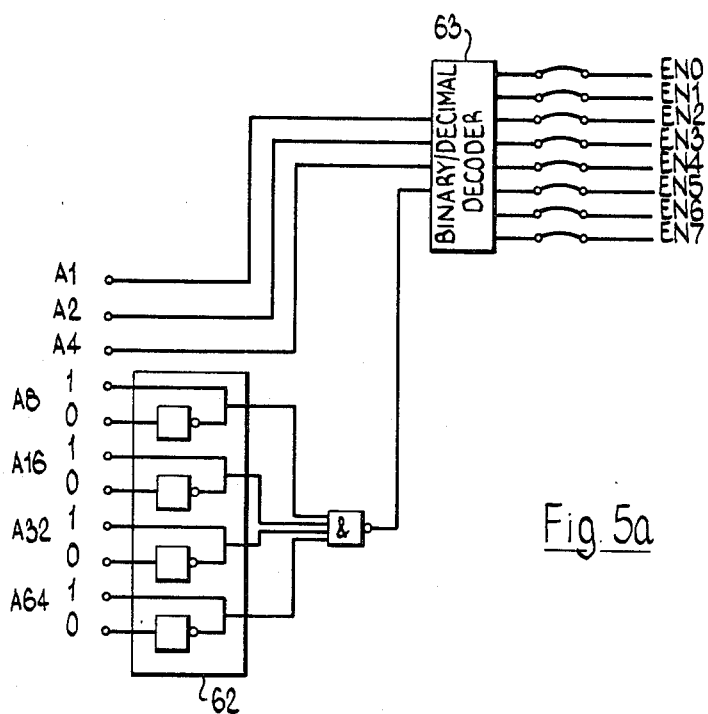
Figure 5B:
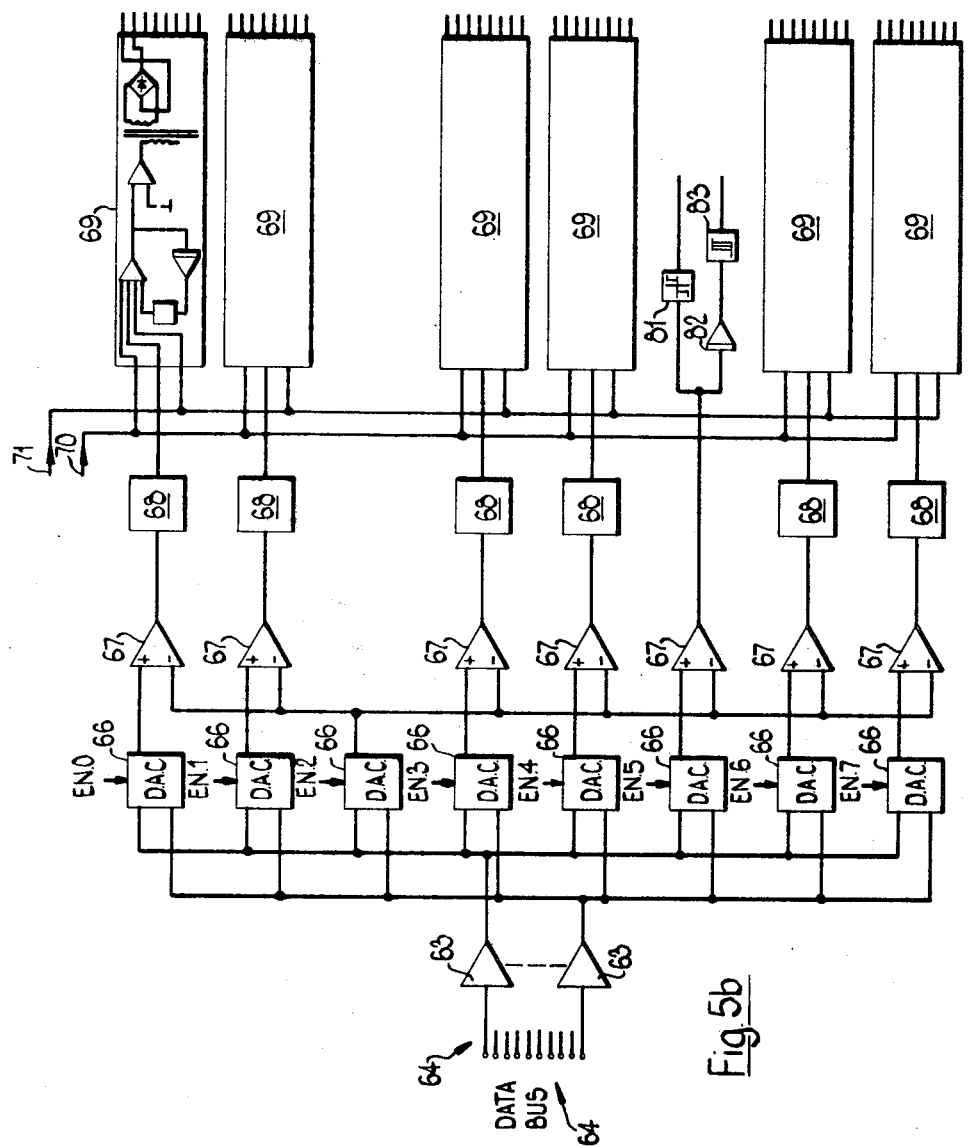

One of the temperature trip modules is shown in FIGS. 5a and 5b, to which reference is now directed. The coding of multiplexer addresses is performed by the circuitry shown in FIG. 5b. The address highway contains seven bits since it has to carry one hundred and twenty-eight different addresses. The most significant four bits carry the address of the temperature trip module to be enabled and the least significant three bits are decoded in each module to form eight sub-addresses, each sub-address being indicative of one thermocouple or reference channel. The most significant bits are denoted by A6, A16, A32 and A64, these bits passing through an appropriate inverter array 62 and NAND gate to enable an appropriate binary to decimal decoder 63 for the temperature trip unit module. The outputs from the sub-address decoders are brought out adjacent to eight enable inputs, one for each trip channel respectively, the connections being made in such a way as to mimic the connections in the multiplexer, as may be seen from FIG. 7 to which reference is now also directed. The outputs are indicated as EN0, EN1, EN2 . . . EN7. Consequently, all sixteen temperature trip modules can be identical, they differ in use only because of the connector socket wiring. In FIG. 7, the data lines are indicated by 0, 1, 3, 4, 6 and 7 and the cold junction and high temperature reference lines by 2 and 5 respectively. From this figure, it can be seen that the cold temperature signal moves from 2 to 1 to 0 to 7 and so on and the hot temperature reference from 5 to 4 to 3 and so on the mimic the input connections to the multiplexer in order that the signals are analysed in the form in which they were fed into the multiplexer.

In FIG. 5b, a data bus for the temperature trip units is indicated at 64. The data bus contains ten bits and a bus of 63 is inserted in each line, only two of the buffers being shown for convenience. The input data is fed sequentially to individual digital to analogue converters 66, only one at a time being enabled to sample the data according to the relevant address from the decoder 62. The cold junction channel, with the digital to analogue converter enabled by EN2, samples the data highway 64 and stores the new cold junction temperature in its digital input register for the remainder of the sampling interval. The output of this digital to analogue converter is fed to the other seven sections of the temperature trip module to provide cold junction compensation. Its polarity reverses on alternate scans because of the reverser 10 (see FIGS. 1a to 1c, 2 and 3 and the description above). Special monitoring of the cold junction compensation signal is not effected because failure causes the associated six channels which use the compensation signal to trip.

Figure 6:
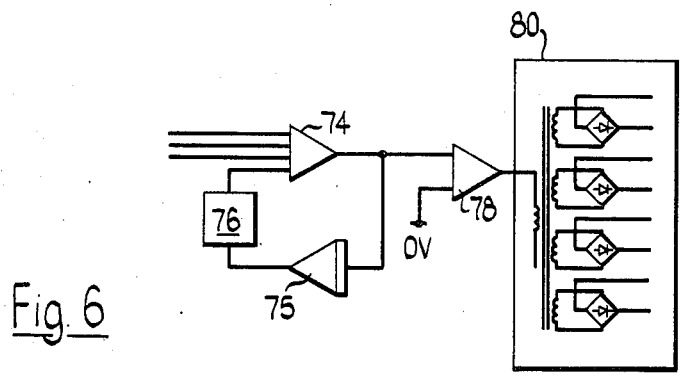
FIG. 6 is a more detailed view of part of FIG. 5.

The six trip units have digital to analogue converters enabled by EN0, EN1, EN3, EN4, EN6 and EN7 as their input. Only the converter enabled by the address logic samples the data highway. The analogue output of the appropriate digital to analogue converter 66 is fed to an appropriate one of a group of differencing amplier 67, wherein the cold junction compensation signal is subtracted. The output of the amplier 67 is then coupled in an alternating current fashion into a rectifier 68 and then fed to an analogue trip unit 69. Alternating current coupling means that the output signal will fall to zero if the multiplexer fails to refresh the input to any or all of the demultiplexed trip units and is made possible by the action of polarity reversing switch 10. An alternating current reference signal on line 70 and a reference table on line 71 are also fed into the trip unit 69, one of which is now described in more detail with reference to FIG. 6.

The trip unit 68 comprises a summing operational amplifier 74, and integrator 75 in the feedback line of the amplier 74, a limiter 76 in series with the integrator 75 and a zero crossing detector 78. The output of the zero crossing detector can be fed to pulse coded guard lines via the vote and guard line logic unit 61, which were described above. Additionally, a transformer rectifier arrangement 80 can be used to give 4 direct current outputs if this is deemed necessary for other types of guard line logic. Such direct current outputs would, of course, collapse if the alternating current input to the transformer should fail. The trip unit is arranged to trip if the rate of change of temperature of the thermocouples is greater than 25° Celsius per minute or if the temperature is in excess of an adjustable minute which is usually between 60° and 90° Celsius above the reference level on 971. The output of the feedback integrator is limited by the limit of 76 so that it cannot have an output great enough to compensate for the deviation outside the adjustable limit.

Trip threshold detection is achieved by superimposing an alternating reference from line 70 onto the level and rate trip signals. The combined signals untimately cross the threshold of the zero crossing detector under healthy conditions. The tripped state comes about when the alternating reference is offset by the level or rate trip signals sufficiently to fail to cross the threshold of the zero crossing detector, thereby causing loss of dynamic output and interaction of the guard line. The alternating reference must be accurately controlled, since it defines the trip threshold level.

Reference is made again to FIGS. 5a and 5b, in which there is shown also a high temperature reference channel in each temperature trip unit module, which channel is fed when the analogue to digital converter enabled by EN5 is enabled. The polarity of the high temperature signal alternates because of the action of the polarity reversing switch 10, but in healthy conditions it has an amplitude which is constant within the limits of resolution of the multiplexing system. Departures from healthy condition can be caused by any failure of the multiplexer system which causes this channel to receive a normal cold junction temperature reading. A window comparator 81 detects if the output from the digital to analogue converter is not healthy. If the polarity of the high temperature reference table does not change, then an integrator 82 which also taps the EN5 converter output will have an output which goes above another comparitor 83 to alarm the system.

To summarise, the multiplexed sampled data generated as described above with reference to FIG. 2 may be demultiplexed, converted to analogue form and then processed by individual analogue trip units as an alternative to time shared processing by a digital computer. In the example shown, the multiplexed sample data is distributed to individual digital to analogue convertors. The analogue inputs to the subsequent individual trip units are held constant between sampling instance by storing the digital value of the samples in the input registers of the digital to analogue converters. Dynamic operation of the digital to analogue convertors, including their storage elements, is effected by polarity reversal on consecutive cycles of the multiplexer, as described above in order to achieve dynamic (that is failsafe) operation of the computer memory. The alternating output of the digital to analogue convertors is then passed through a transformer or capacitor and rectified to feed the analogue trip unit. The alternating current coupling is made possible by the alternating polarity introduced by the polarity switch to ensure that any failure of the multiplexer to refresh to input to any or all of the demultiplex trip units will result in a zero (that is failsafe) signal.

Recognition of the wired input pattern to the multiplexer is effected by a corresponding pattern of wiring of the demultiplexed address decoder. By this means, the sample data is directed sequentially, on the multiplexing, to the appropriate analogue processing module. Any change in the order in which data is presented to the analogue processing modules, owing to a multiplexer or demultiplexer failure will be detected in the module.

From the above description, it can be seen that an improved monitoring means is provided.

What is claimed is:

1. A monitoring means for an industrial process plant or apparatus which processes data signals from inputs from equipment or transducers associated with the processor apparatus and provides information or control signals therefor, the monitoring means including a data transmission assembly including a multiplexer arrangement, the data transmission assmebly being physically wired with inputs in the assembly disposed in a test pattern, the test pattern including a pluarlity of input addresses in the multiplexer arrangement for receiving test signals, which addresses rotate through the pattern, the rotation being effected by the physical wiring connected to the addresses.

2. A monitoring means as claimed in claim 1, comprising a computer-based system for receiving and decoding data from the data transmission assembly, the computer based system comprising a pattern recognition logic for recognizing the test pattern.

3. A monitoring means as claimed in claim 1, which comprises a polarity reverser switch disposed between the multiplexer arrangement and the remainder of the monitoring means, the polarity reverser switch reversing polarity after each cycle of the multiplexer arrangement.

4. A monitoring means as claimed in claim 1, comprising a hard-wired system which mimics the physical wiring of the data transmission assembly for receiving and decoding data from the transmission assembly.

5. A monitoring means for an industrial process plant or apparatus which processes data signals from inputs from equipment or transducers associated with the process or apparatus and provides information or control signals therefor, the monitoring means comprising a data transmission assembly including a number of multiplexers, which assembly is physically wired with inputs in the assembly disposed in a test pattern, the test pattern having input addresses to the multiplexers for receiving test signals, which addresses rotate cylicly from one multiplexer to its neighbour, a computer-based system for receiving data and decoding data from the transmission assembly by being programmed to rotate received data to recognize the test signals and a hard-wired system for receiving and decoding data from the data transmission assembly, the hard-wired system physically mimicking the test pattern, a polarity reverser being disposed between the transmission assembly and the computer-based system and the hard-wired system, the polarity reverser switch reversing after each cycle of the multiplexers to cause transmission of a dynamic signal.

* * * * *